No. 784,197. PATENTED MAR. 7, 1905.
G. H. WINSLOW.
HOLDER FOR LENSES OF EYEGLASSES, &c.
APPLICATION FILED APR. 4, 1904.

FIG. 6ª.

WITNESSES:
H. Herbert Bradley
Fred Kirchner

INVENTOR
George H. Winslow
by Christy and Christy
Att'ys

No. 784,197.  
Patented March 7, 1905.

UNITED STATES PATENT OFFICE.

GEORGE H. WINSLOW, OF BELLEVUE, PENNSYLVANIA.

HOLDER FOR LENSES OF EYEGLASSES, &c.

SPECIFICATION forming part of Letters Patent No. 784,197, dated March 7, 1905.

Application filed April 4, 1904. Serial No. 201,432.

*To all whom it may concern:*

Be it known that I, GEORGE H. WINSLOW, a citizen of the United States, residing at Bellevue, in the county of Allegheny and State of Pennsylvania, have invented or discovered certain new and useful Improvements in Holders for Lenses of Eyeglasses, &c., of which improvements the following is a specification.

The invention described herein relates to certain improvements in grips or clamps whereby the nose-guard and spring are connected to the lenses of eyeglasses, &c., and has for its object a construction wherein the lens-clamping members are provided with lugs or ears, which when the clamping members are properly secured to the lens will form a pocket for the reception of the spring and the ear on the nose-guard.

The invention is hereinafter more fully described and claimed.

Figure 1:
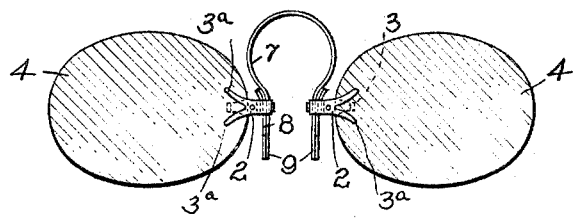
Figure 2:
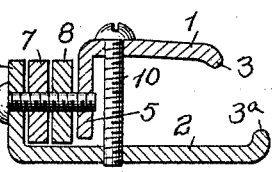
Figure 17:
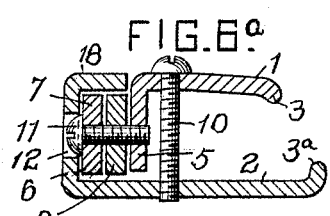
Figure 17:
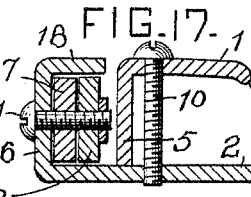
Figure 8:
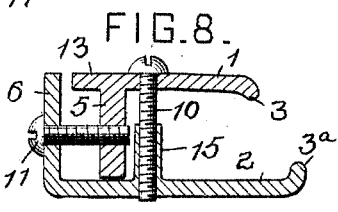
Figure 9:
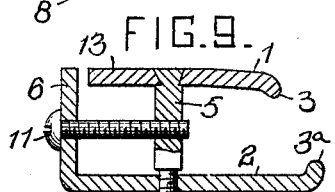
Figure 15:
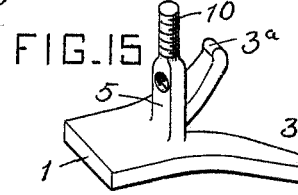
Figure 16:
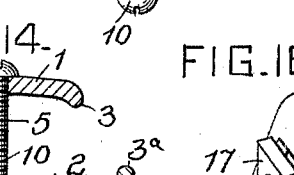

In the accompanying drawings, forming a part of this specification, Figure 1 is an elevation of a pair of eyeglasses having my improved grips or clamps applied thereto. Fig. 2 is a side elevation, on an enlarged scale, of one form of my improved grip or clamp. Figs. 3 to 14, inclusive, are views similar to Fig. 2 and illustrate modifications of the clamp. Fig. 15 is a perspective view illustrating a modification of one of the clamping members of Fig. 9, and Fig. 16 is a perspective view of one of the members shown in Fig. 14. Fig. 17 illustrates a modification in the manner of securing spring and ear on nose-guard in the pocket.

Figure 3:
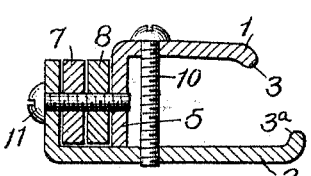
Figure 5:
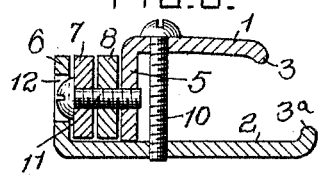
Figure 6:
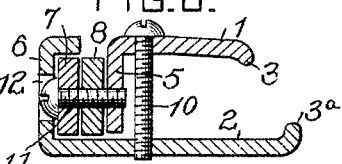

In the practice of my invention the clamp or grip is formed of two parts or members, as 1 and 2, one of said parts, as 1, having a prong 3 at its inner end, while the other part is provided with two or more prongs 3ª, adapted to engage the sides of the lens 4. The clamping members are provided with ears or lugs 5 and 6, which project inwardly and form between them a pocket for the reception of the end of the spring 8 and the lug 7 on the nose-guard 9. In the construction shown in Figs. 2, 3, 5, 6, 7, and 14 the lugs or ears are formed at the outer ends of the members 1 and 2, one of which is made sufficiently longer than the other that there will be sufficient space between them for the reception of the spring and ear on the nose-guard. The two members are drawn toward each other, so as to grip the lens, by means of a screw 10, passing through one member and screwing into the other. The lugs or ears 5 and 6 are drawn toward each other to grip the spring and ear on the nose-guard by a screw 11 passing through one of the lugs and the parts 7 and 8 and screwing into the lug 5. If desired, the lug 5 may be made of such a length that its end will bear on the other member 2, as shown in Fig. 3, or may be made shorter, as shown in Figs. 2 and 6, in which case the tightening of the screw 10 will bring transverse pressure to bear on the screw 11, thereby locking the latter as against accidental loosening. While it is preferred that the spring and ear on the nose-guard should be clamped between the lugs 5 and 6, said parts may be clamped by the screw 11 to only one of the lugs, as shown in Figs. 5, 6, and 6ª. As shown therein, the head of the screw bears upon the end of the spring 7, the lug 6 having an opening 12 therethrough sufficiently large to permit of the passage of the head of the screw 11. As the lug 6 will in the completed article bear against the end of the spring 7, the head of the screw 11 will be within the opening 12 in the lug 6.

In placing the parts of the lens grip or clamp on the lens screw 10 is not tightened up completely until after the tightening up of the screw 11, whereby the parts 5 and 6 are drawn toward each other to clamp the spring and ear on the nose-guard. As the screw 10 is slight and will not fit tightly in one of the members 1 or 2, a slight longitudinal movement of the members 1 and 2 relative to each other will take place, one of the members sliding slightly along the surface of the lens.

A closed pocket for the spring and the ear of the nose-guard can be formed by an extension from one or both of the clamping members. In the construction in Figs. 8, 9, 10, 12, and 13 the extension indicated at 13 is in line with the body of the member 1 and extends from the junction of such member with the lug over the space occupied by the spring and ear of the nose-guard. In the construction shown in Figs. 6, 6ª, 14, and 17 the extension indicated at 18 is formed at the end of the lug 6 on the member 2. As shown in Fig. 1, the pocket is closed by short extensions from both clamping members.

Figure 4:
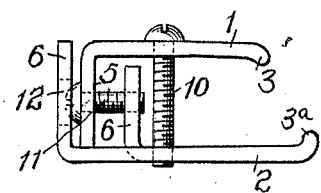

As shown in Fig. 4, the head of the screw 11 may be protected by a lug 14, projecting from an extension of the member 6 along the lug 5 and having an opening or recess 12 for the reception of the head of the screw.

Figure 7:
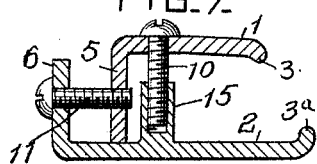
Figure 10:
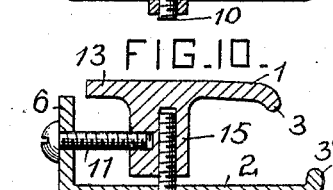

In the construction shown in Figs. 2, 3, 5, 6, 7, and 14 the lugs 5 and 6 are formed by bending the ends of the members 1 and 2. The lug 5 on member 1 may, if desired, be formed of another piece of metal and secured to the member in any suitable manner, as by brazing or riveting, as shown in Figs. 8, 9, 10, and 11, or the lug 5 may be struck up from the member 1, as shown in Fig. 15, and the lug 6 on member 2 may be similarly formed, as shown in Fig. 4. As the parts or members are made quite thin, it is sometimes desirable in order to give the screw 10 a better hold to form a heavier lug 15 on one of the members for the reception of the threaded end of the screw 10, as shown in Figs. 7, 8, and 10. The lugs 5 and 15 may be formed as a single lug for the reception of the threaded ends of the screws 10 and 11, as shown at 16 in Fig. 10.

Figure 12:
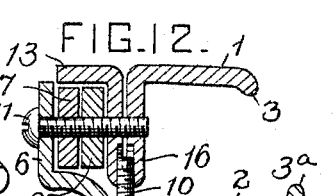
Figure 13:
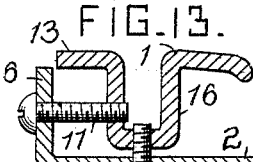
Figure 11:
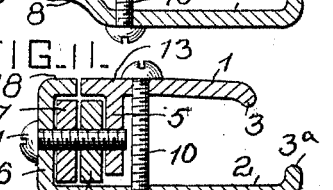

In Figs. 12 and 13 the lug 16 is formed by suitably bending the member 1 intermediate of its ends. The screw 11 may be made sufficiently long to engage both legs of the hollow lug 16 or may be shortened to engage only one leg of the lug.

Figure 14:
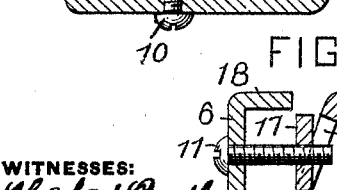

As shown in Figs. 14 and 16, the lug 5 of the member 1 may be formed with a resilient piece 17 to bear upon the spring 7, such resilient bearing being formed by partially cutting out a portion of the lug 5.

As shown in Fig. 17, the spring and ear on the nose-guard may be secured in the pocket by a screw and nut and without any clamping action between lugs in the members 1 and 2.

I claim herein as my invention—

1. A lens grip or clamp having in combination two clamping members having at one end means for engaging the lens, and each provided with an inwardly-projecting lug, said lugs being so arranged as to form in conjunction with a portion of one of the members three sides of a pocket for the spring and nose-guard.

2. A lens grip or clamp having in combination two clamping members, each having at one end means for engaging the lens, and each having an inwardly-projecting lug, the lug on one member being arranged at the end thereof, said lugs being so arranged as to form in conjunction with a portion of one of the members three sides of a pocket for the spring and nose-guard.

3. A lens grip or clamp having in combination two clamping members provided at one end with means for engaging the lens, each member having an inwardly-projecting lug; the lug on one member being arranged at the end thereof, and the lug on the other member intermediate of its ends, said lugs being arranged to form in conjunction with a portion of one of the members three sides of a pocket for the spring and nose-guard.

4. A lens grip or clamp having in combination two clamping members provided at one end with means for engaging the lens, each having an inwardly-projecting lug, the lug on one member being arranged at the end thereof, said lugs being arranged to form a pocket for the reception of the spring and nose-guard, and an extension on one of said members projecting over the pocket for the spring and nose-guard.

5. A lens grip or clamp having in combination two clamping members each having means for engaging the lens, and each provided with inwardly-projecting lugs arranged at the ends of the members, the lug on one member being turned inward parallel or approximately so to the body of the member, said lugs being so arranged as to form a pocket for the spring and nose-guard.

6. A lens grip or clamp having in combination two clamping members each having means for engaging the lens and each provided with inwardly-projecting lugs so arranged as to form between them a pocket for the reception of the spring and an ear on the nose-guard, the lug on one member being formed by suitably bending the member at a point intermediate of its ends.

7. A lens grip or clamp having in combination two clamping members each having means for engaging the lens, a screw for drawing the clamping members together and a screw for moving one member longitudinally of the other, substantially as set forth.

8. A lens grip or clamp having in combination two clamping members adapted to bear on opposite sides of the lens, each member provided with an inwardly-projecting lug, said lugs being so arranged as to form between them a pocket for the spring and nose-guard and a screw for drawing said clamping members toward each other, substantially as set forth.

9. A lens grip or clamp having in combination two clamping members each provided with inwardly-projecting lugs arranged to form between them a pocket for the spring and nose-guard, a screw for drawing the members toward each other and a screw for drawing the lugs toward each other and clamping the spring and nose-guard, substantially as set forth.

10. A lens grip or clamp having in combination two clamping members adapted to bear on opposite sides of a lens, a screw for drawing said members toward each other, inwardly-projecting lugs on the members arranged to form a pocket for the reception of the spring and nose-guard, one of said lugs being formed with a resilient section and a screw passing through one lug and engaging the resilient section of the other lug, substantially as set forth.

In testimony whereof I have hereunto set my hand.

GEORGE H. WINSLOW.

Witnesses:
F. E. GAITHER,
FRED KIRCHNER.